United States Patent [19] | [11] 4,413,261
Greenberg | [45] Nov. 1, 1983

[54] CODED CONTROL FOR VEHICLE ENGINE IGNITION CIRCUIT

[75] Inventor: Melvin B. Greenberg, North Miami Beach, Fla.

[73] Assignee: Arthur F. Glaeser, Deerfield Beach, Fla.

[21] Appl. No.: 250,121

[22] Filed: Apr. 2, 1981

[51] Int. Cl.[3] .................... H04Q 7/00; F02N 11/12

[52] U.S. Cl. .................... 340/825.72; 340/64; 340/825.69; 340/825.64; 340/345; 340/354; 340/696; 455/31; 455/38; 290/DIG. 3; 375/69; 307/10 AT; 290/38 C

[58] Field of Search .................... 340/825.72, 825.73, 340/825.75, 825.3, 825.31, 825.69, 539, 345, 348, 351, 354, 696, 64, 53, 825.04, 825.76, 825.39, 825.44, 825.53, 825.56, 825.57, 825.63–825.68; 307/10 AT, 10 R; 290/38 C, DIG. 3, 40 E, 41; 180/167, 271; 455/95, 99, 100, 38, 31, 228; 375/69

[56] References Cited

U.S. PATENT DOCUMENTS

| | | | |
|---|---|---|---|
| 3,403,381 | 9/1968 | Haner | 340/825.75 |
| 3,648,174 | 3/1972 | Fukata | 340/696 |
| 3,756,341 | 9/1973 | Tonkowich et al. | 180/114 |
| 3,987,408 | 10/1976 | Sassover et al. | 340/825.72 |
| 4,090,089 | 5/1978 | Morello et al. | 307/40 |
| 4,158,874 | 6/1979 | Ellsberg | 361/172 |
| 4,180,043 | 12/1979 | Kawamura | 123/146.5 B |
| 4,192,400 | 3/1980 | McEwan | 180/287 |
| 4,227,588 | 10/1980 | Biancardi | 180/167 |
| 4,233,642 | 11/1980 | Ellsberg | 361/172 |
| 4,236,594 | 12/1980 | Ramsperger | 180/167 |
| 4,240,516 | 12/1980 | Henderson et al. | 180/289 |

*Primary Examiner*—Donnie L. Crosland
*Attorney, Agent, or Firm*—Oltman and Flynn

[57] ABSTRACT

The engine ignition circuit on a motor vehicle is controlled by an electronic switch which is part of a receiver/controller unit on the vehicle. A separate self-contained transmitter unit generates a seven digit coded address at a certain baud rate which modulates an RF carrier of a certain frequency. In the receiver/controller unit, if the baud rate and the carrier frequency of the transmitted signal are correct, the coded address is compared with a stored coded address. If they match, the electronic switch is closed, enabling the vehicle engine to be started. The usual ignition switch on the vehicle must be closed before the receiver/controller unit can be effective. The receiver/controller unit remains on for a minute or two after the ignition switch is opened.

12 Claims, 2 Drawing Figures

CODED CONTROL FOR VEHICLE ENGINE IGNITION CIRCUIT

SUMMARY OF THE INVENTION

This invention relates to a coded control system for a vehicle engine ignition circuit.

Various anti-theft arrangements have been proposed heretofore to prevent the engine of an automotive vehicle from being started unless a coded signal, known by an authorized driver of the vehicle, has enabled the engine ignition circuit. In some of these prior proposals a code transmitter is wired into the engine ignition circuit while in others the code transmitter is a radio transmitter which broadcasts the coded signal to a receiver wired into the engine ignition circuit.

The present invention is directed to a coded control system for a vehicle engine ignition system which uses a self-contained radio transmitter unit for broadcasting a coded signal to a receiver/controller unit on the vehicle which is wired into the vehicle's engine ignition circuit.

The preferred embodiment of the present coded control system has the following features which contribute to the security it provides against unauthorized starting of the vehicle engine:

(1) the coded signal required to enable the engine ignition circuit on the vehicle must be the correct single code out of 128 possibilities;

(2) the bits of the coded signal must be transmitted at a predetermined baud rate;

(3) the carrier frequency at which the transmitter unit operates must be at a particular frequency which corresponds to the frequency to which the receiver is tuned; and (4) the vehicle ignition switch must be closed before the transmitter unit broadcasts the coded signal, otherwise the coded signal will not be effective to enable the engine ignition circuit.

An advantageous feature of the present control system is that, once it has enabled the engine ignition circuit, it keeps this circuit enabled for a short time interval after the vehicle driver has opened the ignition switch, so that if the driver recloses the ignition switch during this time interval the engine will restart immediately without the necessity of operating the code transmitter again.

Another advantageous feature of the present system is that, when the ignition switch is closed after being open for several minutes, the receiver/controller unit is reset to a starting condition in which it is ready to respond to the next transmitted coded signal.

A principal object of this invention is to provide a novel and improved coded control system for the ignition circuit of a vehicle engine to prevent unauthorized starting of the vehicle.

Further objects and advantages of this invention will be apparent from the following detailed description of a presently preferred embodiment which is shown schematically in the accompanying drawing.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
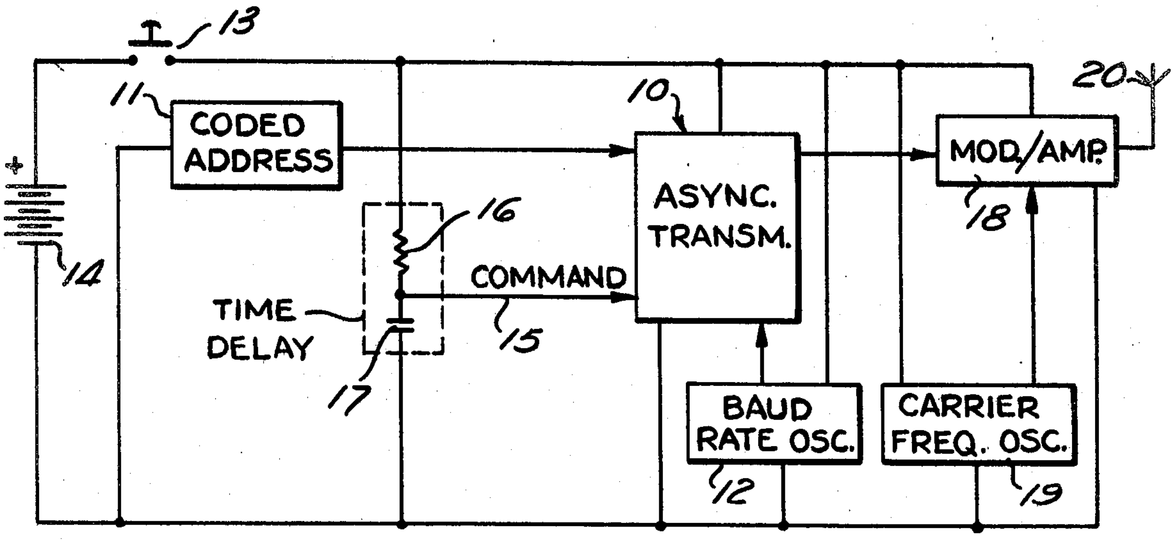
FIG. 1 is a schematic electrical circuit diagram of the coded transmitter unit in the present control system.

Referring to FIG. 1, the transmitter unit in the present system has an asynchronous transmitter 10 which receives a 7 bit coded address from an address source 11, which is adjustable to select any one of 128 different address codes. The asynchronous transmitter 10 is controlled by a baud rate oscillator 12 which determines the speed at which the transmitter produces discrete signal bits.

When the push-button switch 13 is closed, an internal battery 14 in the transmitter unit applies a command signal via line 15 to the asynchronous transmitter after a delay interval, determined by the R-C delay circuit 16, 17, long enough for the oscillator and other circuitry in the asynchronous transmitter 10 to stabilize. This command signal loads the coded address into the asynchronous transmitter 10 and it produces, in sequence, a start bit, the seven bits which make up the coded address to be transmitted, and a stop bit. These bits are applied sequentially to a modulator and amplifier 18 at a predetermined baud rate under the control of oscillator 12.

A carrier frequency oscillator 19 is turned on when the push-button switch 13 is closed. This oscillator produces an RF carrier signal at a predetermined frequency which is applied to the modulator in block 18 and is modulated therein by the coded address coming from the asynchronous transmitter 10. The amplifier in block 18 delivers this modulated carrier to a broadcast antenna 20.

Preferably, the entire transmitter unit of FIG. 1 is enclosed in a small, portable housing which an authorized driver of the vehicle may carry on his person and hold in his hand.

Figure 2:
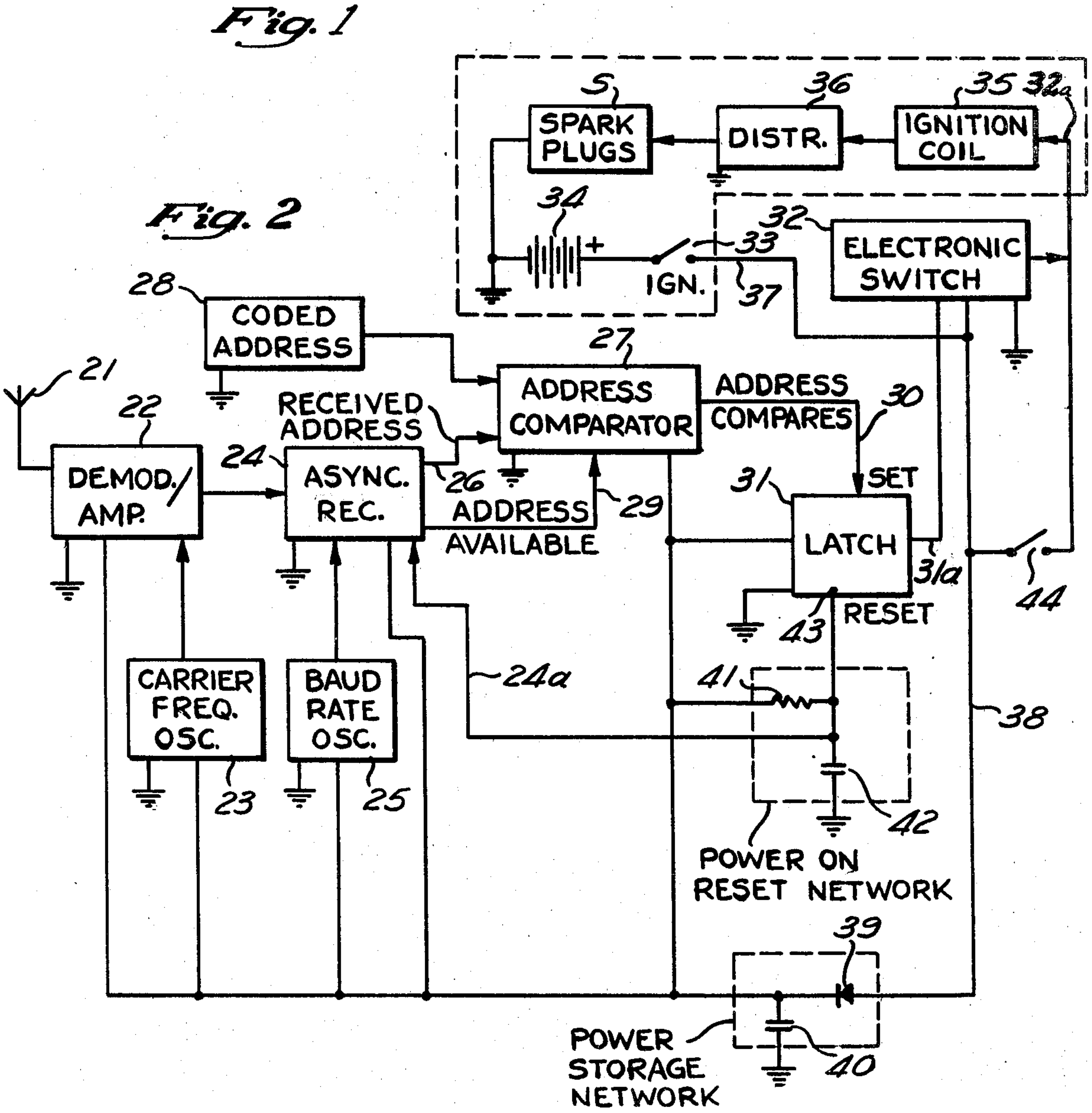
FIG. 2 is a schematic electrical circuit diagram of the receiver/controller unit and the engine ignition circuit which it controls.

Referring to FIG. 2, the receiver/controller unit which controls the engine ignition circuit includes an antenna 21 for receiving the signal broadcast by antenna 20. The received signal is applied to one input of a demodulator and amplifier 22. Another input to the demodulator in block 22 is provided by a carrier frequency oscillator 23, which operates at the same frequency as the carrier frequency oscillator 19 in the transmitter unit of FIG. 1. The demodulator in block 22 recovers the incoming signal, including the coded address which modulated the transmitted carrier at the baud rate determined by oscillator 12.

This recovered signal is applied to one input of an asynchronous receiver 24, which has a second input from a baud rate oscillator 25 operating at the same rate as the baud rate oscillator 12 in the transmitter unit. The seven bits which make up the received coded address are applied via a seven line output port 26 from the asynchronous receiver 24 to one input port of an address comparator 27. A second input to this comparator is a coded address stored in block 28, which also may be any one of the same 128 codes which the coded address source 11 in the transmitter may be adjusted to produce. The address comparator 27 compares the two coded address signals after receiving an "address available" signal via line 29 from the asynchronous receiver 24 after receipt of the stop bit which immediately followed the 7-bit address code in the signal broadcast by the transmitter.

If the two coded addresses are the same, the comparator 27 will produce an "address compares" signal on its output line 30. This signal sets a latch circuit 31 which closes an electronic switch 32.

The engine ignition circuit enclosed within the dashed-line box in FIG. 2 is shown in simplified form as including the vehicle battery 34, ignition switch 33, ignition coil 35, distributor 36 and spark plugs S. Not shown are the usual distributor points and condenser, connected in parallel with each other between the primary winding of the ignition coil 35 and ground. The secondary winding of the ignition coil is connected to the distributor 36.

In accordance with the present invention, the electronic switch 32 is interposed between the ignition switch 33 and the ignition coil 35. An input line 37 to the electronic switch 32 is connected to the ignition switch 33, and an output line 32*a* from the electronic switch is connected to the primary of the ignition coil 35.

The electronic switch 32 closes, and consequently the engine ignition circuit is enabled, whenever the coded address received from the remote transmitter unit matches the coded address stored at 28 in the receiver, provided also that the following separate and independent conditions are met:

(1) the carrier frequency oscillator 19 in the transmitter unit operates at the same frequency as the carrier frequency oscillator 23 in the receiver/controller unit; and (2) the baud rate oscillator 12 in the transmitter unit provides the same signalling speed as the baud rate oscillator 25 in the receiver/controller unit.

From FIG. 2 it will be apparent that the demodulator/amplifier 22, the carrier frequency oscillator 23, baud rate oscillator 25, asynchronous receiver 24, address comparator 27, and latch circuit 31 in the receiver/controller unit all are powered by the vehicle battery 34 when the ignition switch 33 is closed. The power supply circuit includes lines 37 and 38 and a power storage network made up of a rectifier 39 in series with line 38 and a capacitor 40 connected between the cathode of rectifier 38 and the grounded negative terminal of the vehicle battery 34. The various components of the receiver/controller unit are turned on by closing the ignition switch 33. After the ignition switch is opened, these components remain on for a brief interval, such as a minute or so, in case the driver closes the ignition switch 33 again during this interval. The capacitor 40 in the power storage network provides this time delay between the opening of the ignition switch 33 and the de-energization of the demodulator/amplifier 22, the carrier frequency oscillator 23, the baud rate oscillator 25, the asynchronous receiver 24, the address comparator 27 and the latch circuit 31.

A power on reset network, made up of a resistor 41 and a capacitor 42, determines the initial power-on reset state of the latch circuit 31. Resistor 41 is connected between the cathode of rectifier 39 in the power storage network and the reset terminal 43 of the latch circuit 31. Capacitor 42 is connected between this reset terminal and ground.

A normally-open manual switch 44 bypasses the entire remote control system. This bypass switch is connected between the ignition switch 33 and the ignition coil 35, so that when closed it puts the engine ignition entirely under the control of the ignition switch 33 and independent of the electronic switch 32. Switch 44 would be used only if a malfunction occurs in the present coded control system or if for some other reason the user wants to bypass the coded control system altogether.

The lines 37 and 32*a*, connected respectively to the input and output of the electronic switch 32, may have special connectors to facilitate their connection in the engine ignition circuit.

Everything shown in FIG. 2 preferably is in or close to the engine compartment of the vehicle.

OPERATION

Assuming that the ignition switch 33 has been closed but the "address compares" signal has not appeared on line 30, the vehicle battery potential applied via resistor 41 to terminal 43 of the latch circuit 31 will reset this latch circuit to a condition in which it maintains the electronic switch 32 open, so that the engine ignition circuit is not enabled. Also, this same potential is applied via line 24*a* to the asynchronous receiver 24 to remove any signals which may be present at its output terminals.

When the "address compares" signal does appear on line 30, in response to the operation of the transmitter unit of FIG. 1, as described, it sets the latch circuit 31 to the condition in which it closes the electronic switch 32 and thereby enables the engine ignition circuit.

From the foregoing description it will be apparent that the present coded control system incorporates the following practical safety features:

(1) the ignition switch 33 must be turned on before the transmitter unit (FIG. 1) is turned on; otherwise the coded control system will not start the engine;

(2) the coded address broadcast by the transmitter unit must be the correct one of 128 possible codes;

(3) the coded address broadcast by the transmitter unit must be on a carrier whose frequency matches that of the carrier frequency oscillator 23 in the receiver/controller unit (FIG. 2); and (4) the bits of the coded address broadcast by the transmitter unit must occur sequentially at a baud rate which matches that of the baud rate oscillator 25 in the receiver/controller unit.

I claim:

1. A coded control system for a vehicle engine ignition circuit comprising:

a radio transmitter operative to broadcast at a selected carrier frequency, a source of a digital coded address, means in said transmitter for modulating said carrier with the bits of said coded address sequentially at a predetermined baud rate;

a radio receiver responsive only to said selected carrier frequency modulated at said predetermined baud rate only to recover said digital coded address broadcast by the transmitter;

comparator means operatively coupled to said receiver to compare the received digital coded address with a stored digital coded address;

and means operatively coupled to said comparator means for enabling said ignition circuit to start the vehicle engine when said received coded address matches said stored coded address.

2. A system according to claim 1, and further comprising means operatively connecting said receiver to an ignition switch in the ignition circuit to enable said receiver in response to the closing of said ignition switch.

3. A system according to claim 1, and further comprising means operatively connecting said comparator means to an ignition switch in the ignition circuit to enable said comparator means in response to the closing of said ignition switch.

4. A system according to claim 1, wherein said means for enabling comprises:

an electronic switch;

means for connecting said electronic switch in series with an ignition switch in the engine ignition circuit;

and a latch operatively connected between said comparator means and said electronic switch to close said electronic switch when the received coded address matches said stored coded address in said comparator means and to keep said electronic switch closed until after said ignition switch is opened.

5. A system according to claim 4, and further comprising means operatively connecting said receiver, said comparator means and said latch to the ignition switch to enable said receiver, said comparator means and said latch in response to the closing of said ignition switch.

6. A coded control system for a vehicle engine ignition circuit comprising:

a radio transmitter operative to broadcast at a selected carrier frequency, means in said transmitter for modulating said carrier with a coded address at a predetermined baud rate;

a radio receiver responsive only to said selected carrier frequency modulated at said predetermined baud rate to recover said coded address broadcast by the transmitter;

comparator means operatively coupled to said receiver to compare the received coded address with a stored coded address;

means operatively coupled to said comparator means for enabling said ignition circuit to start the vehicle engine when said received coded address matches said stored coded address;

means operatively connecting said receiver to an ignition switch in the ignition circuit to enable said receiver in response to the closing of said ignition switch;

and a power storage network operatively connected to said receiver to maintain the receiver enabled for a brief time interval after the ignition switch is opened.

7. A coded control system for a vehicle engine ignition circuit comprising:

a radio transmitter operative to broadcast at a selected carrier frequency, means in said transmitter for modulating said carrier with a coded address at a predetermined baud rate;

a radio receiver responsive only to said selected carrier frequency modulated at said predetermined baud rate to recover said coded address broadcast by the transmitter;

comparator means operatively coupled to said receiver to compare the received coded address with a stored coded address;

means operatively coupled to said comparator means for enabling said ignition circuit to start the vehicle engine when said received coded address matches said stored coded address;

means operatively connecting said comparator means to an ignition switch in the ignition circuit to enable said comparator means in response to the closing of said ignition switch;

and a power storage network operatively connected to said comparator means to maintain said comparator means enabled for a brief time interval after the ignition switch is opened.

8. A coded control system for a vehicle engine ignition circuit comprising:

a radio transmitter operative to broadcast at a selected carrier frequency, means in said transmitter for modulating said carrier with a coded address at a predetermined baud rate;

a radio receiver responsive only to said selected carrier frequency modulated at said predetermined baud rate to recover said coded address broadcast by the transmitter;

comparator means operatively coupled to said receiver to compare the received coded address with a stored coded address;

means operatively coupled to said comparator means for enabling said ignition circuit to start the vehicle engine when said received coded address matches said stored coded address, said means for enabling comprising an electronic switch, means for connecting said electronic switch in series with an ignition switch in the engine ignition circuit, and a latch operatively connected between said comparator means and said electronic switch to close said electronic switch when the received coded address matches said stored coded address in said comparator means;

means operatively connecting said receiver, said comparator means and said latch to the ignition switch to enable said receiver, said comparator means and said latch in response to the closing of said ignition switch;

and a power storage network operatively connected to said receiver, said comparator means and said latch to maintain them enabled for a brief time interval after the ignition switch is opened.

9. A coded control system for a vehicle engine ignition circuit comprising:

a radio transmitter operative to broadcast at a selected carrier frequency, means in said transmitter for modulating said carrier with a coded address at a predetermined baud rate;

a radio receiver responsive only to said selected carrier frequency modulated at said predetermined baud rate to recover said coded address broadcast by the transmitter;

comparator means operatively coupled to said receiver to compare the received coded address with a stored coded address;

means operatively coupled to said comparator means for enabling said ignition circuit to start the vehicle engine when said received coded address matches said stored coded address, said means for enabling comprising an electronic switch, means for connecting said electronic switch in series with an ignition switch in the engine ignition circuit, and a latch operatively connected between said comparator means and said electronic switch to close said electronic switch when the received coded address matches said stored coded address in said comparator means;

and means for resetting said latch to a condition in which it opens said electronic switch after the closing of the ignition switch and before a received coded address matches said stored coded address in said comparator means.

10. A coded control system for a vehicle engine ignition circuit comprising:

a radio transmitter operative to broadcast at a selected carrier frequency, means in said transmitter for modulating said carrier with a coded address at a predetermined baud rate;

a radio receiver responsive only to said selected carrier frequency modulated at said predetermined baud rate to recover said coded address broadcast by the transmitter;

comparator means operatively coupled to said receiver to compare the received coded address with a stored coded address;

means operatively coupled to said comparator means for enabling said ignition circuit to start the vehicle engine when said received coded address matches said stored coded address, said means for enabling comprising an electronic switch, means for connecting said electronic switch in series with an ignition switch in the engine ignition circuit, and a latch operatively connected between said comparator means and said electronic switch to close said electronic switch when the received coded address matches said stored coded address in said comparator means;

and means for clearing said receiver of any output signal after the closing of the ignition switch and before the receiver has received a coded address which matches said stored coded address.

11. A coded control system for a vehicle engine ignition circuit comprising:

a radio transmitter operative to broadcast at a selected carrier frequency, means in said transmitter for modulating said carrier with a coded address at a predetermined baud rate;

a radio receiver responsive only to said selected carrier frequency modulated at said predetermined baud rate to recover said coded address broadcast by the transmitter;

comparator means operatively coupled to said receiver to compare the received coded address with a stored coded address;

and means operatively coupled to said comparator means for enabling said ignition circuit to start the vehicle engine when said received coded address matches said stored coded address, said means for enabling comprising an electronic switch, means for connecting said electronic switch in series with an ignition switch in the engine ignition circuit, and a latch operatively connected between said comparator means and said electronic switch to close said electronic switch when the received coded address matches said stored coded address in said comparator means;

and a power-on reset network operable, after the closing of the ignition switch and before a received coded address matches said stored coded address in said comparator means, for clearing said receiver of any output signal and for resetting said latch to a condition in which it opens said electronic switch.

12. A system according to claim 11, and further comprising a power storage network operatively connected to said receiver, said comparator means and said latch to maintain them enabled for a brief time interval after the ignition switch is opened.

* * * * *